United States Patent Office 2,703,430
Patented Mar. 8, 1955

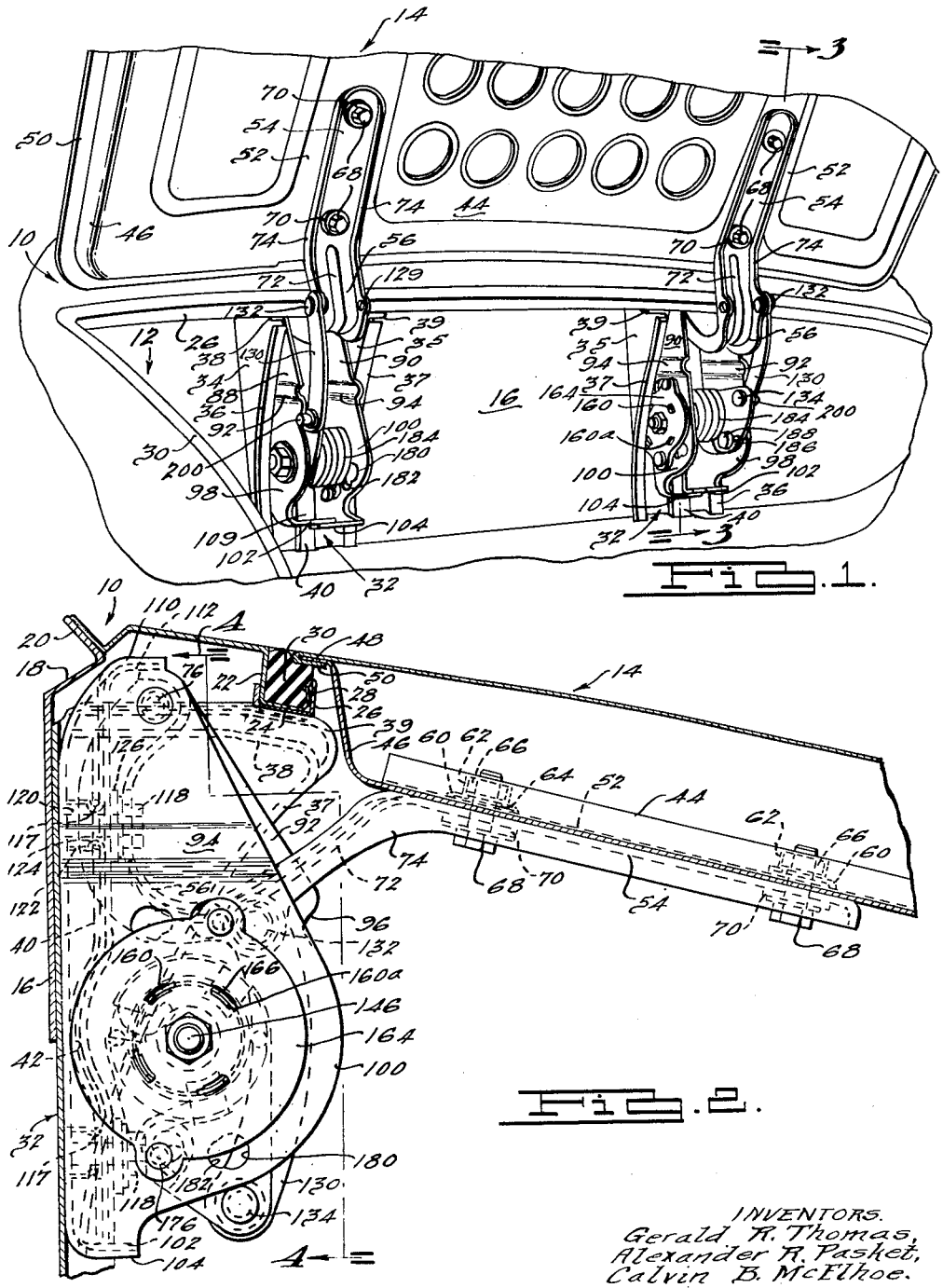

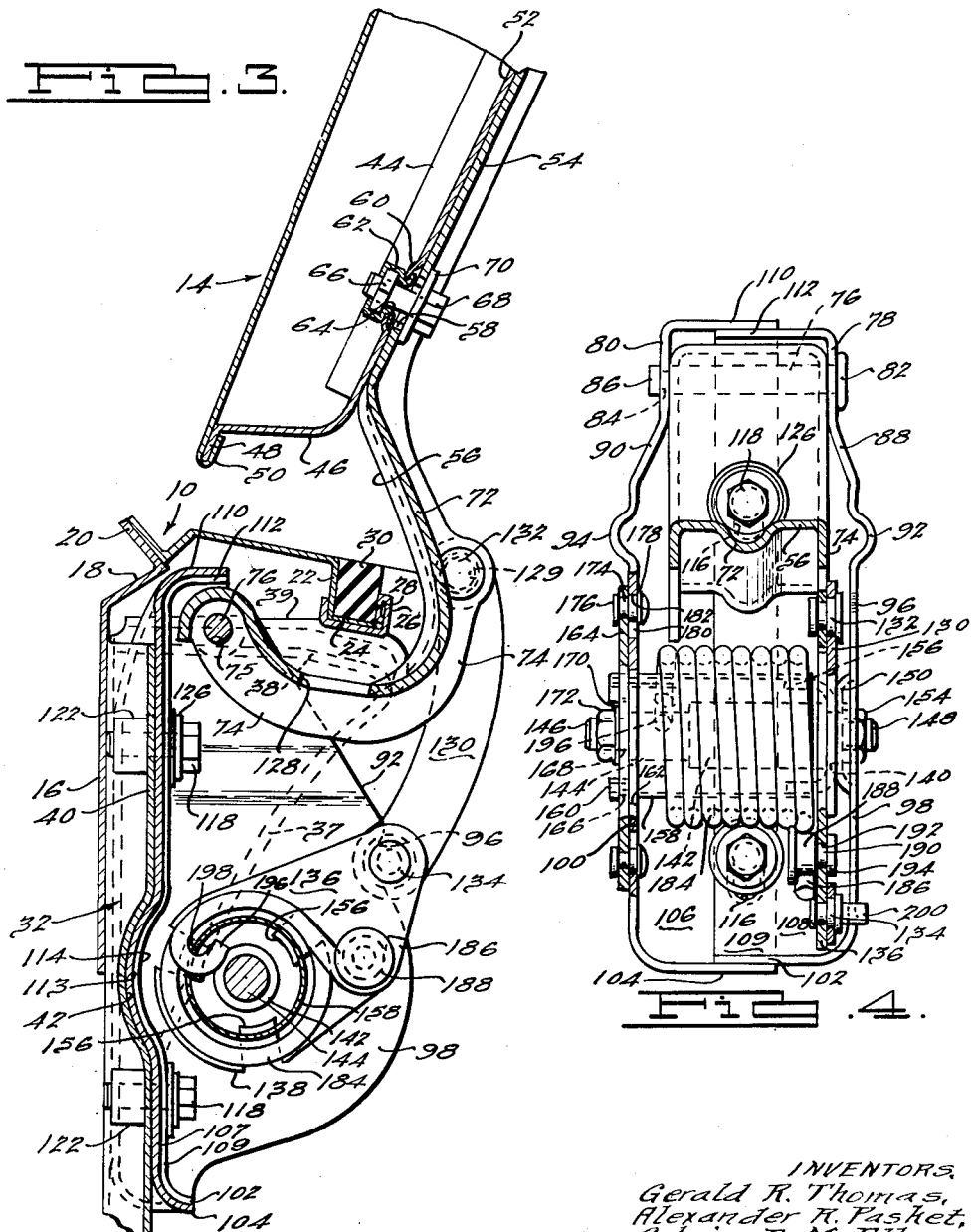

2,703,430

DECK LID HINGE

Gerald R. Thomas, Alexander R. Pasket, and Calvin B. McElhoe, Detroit, Mich., assignors to Briggs Manufacturing Co., Detroit, Mich., a corporation of Michigan Application August 5, 1949, Serial No. 108,748

8 Claims. (Cl. 16—135)

This invention relates to improvements in an automobile body construction, and in particular but not exclusively to an improved hinge device and counterbalancing means for connecting the automobile rear deck lid to the body. However it will be understood from the following that the present invention is also readily adaptable for use as a hinge for the automobile engine hood or comparable swinging members wherein a hinge having the characteristics discussed herein is desired.

In a customary automobile body construction, a rear storage compartment is provided which is accessible through an opening in the rear deck. A hinged cover for the trunk opening, commonly referred to as a rear deck lid, is connected near its forward or upper edge to the automobile body by hinge means so as to enable the deck lid to be manually raised or lowered.

Operation of the conventional rear deck lid in raising and maintaining the same in the open position is frequently accomplished with difficulty and often requires the use of both hands of the operator. Upon opening the lid, the operator must then hold the same with one hand while engaging a latch or detent means with the other hand to hold the lid open. Thereafter, when it is desired to close the lid, the operator must release the detent means with one hand while holding the lid open with the other to prevent the same from slamming shut. Obviously with such a structure, the operator may not conveniently operate the lid with one hand.

Because of the weight of the hinged rear deck lid, the problem has long existed of providing reliable means to assist in raising and lowering the lid and to hold the same surely and safely in the raised position without the requirement of a stop or detent means which must be set or released each time it is desired to operate the lid.

It is accordingly an important object of the present invention to provide an improved, highly efficient, simply and economically constructed hinge structure of the type which may be adapted for use with an automobile rear deck lid of the foregoing character.

Another object of the invention is to provide such a hinge structure which is readily adapted to hold the rear deck lid in the open or raised position surely and safely without the necessity of setting a stop or engaging a latch or detent means, and which will readily release the deck lid for movement to the closed or lowered position without first requiring the release of a latch or detent means.

Another object is to provide such a hinge structure which serves to counterbalance the weight of the deck lid intermediate the raised and lowered positions, thereby permitting the lid to be conveniently and easily raised or lowered with a minimum of physical effort.

Thus by reason of the present invention an operator may readily raise or lower the rear deck lid with one arm, while holding an arm load of packages in the other for example. The lid may be easily raised to the open position and left thereat without further ado, whereupon the lid will remain open. When it is desired to close the lid, the operator need merely pull the same closed with a minimum of effort.

Still other and more specific objects of the present invention are to provide an improved hinge means suitable for use with a rear deck lid employing a torsion spring operatively coupled between the lid and a fixed portion of the automobile body for winding against tension as the lid is closed, so as to counterbalance the latter in opening and closing movements; and to provide such a hinge means wherein the leverage afforded to the lid in winding the spring increases with increased tension on the spring as the lid closes, so that the weight of the lid and tension in the spring are at all times substantially counterbalanced; and further to provide such a structure wherein the movement tending to wind the torsion spring is a minimum during the final stages of closing the deck lid, so that final closure and latching of the deck lid is accomplished with a minimum of effort.

Still another object is to provide such a hinge structure wherein substantially the entire weight of the lid in the fully raised or open position is directed through the pivot point of the hinge, or radially with respect to the directions of winding or unwinding the torsion spring. Accordingly torque exerted by the weight of the lid in the fully raised position tending to wind the spring is at a minimum, permitting the spring to hold the lid in the fully raised or open position readily, not withstanding that the load or tension on the spring is also at a minimum in the open position.

Another object is to provide a hinge means of the foregoing character which is readily adapted for use with existing vehicle bodies with a minimum of modification or alteration of the rear deck lid or body structure.

Other objects of this invention will appear in the following description and appended claims, reference being had to the accompanying drawings forming a part of this specification wherein like reference characters designate corresponding parts in the several views.

In the drawings:

Fig. 1 is a fragmentary perspective view taken from the rear of an automobile body, showing a trunk and rear deck lid or cover therefor in open condition, connected to the body by hinge means constructed in accordance with the present invention.

Fig. 2 is a fragmentary enlarged vertical section through a portion of the body and deck lid in the closed position, showing a side elevation from the mesial or left side of the right hand hinge structure of Fig. 1.

Fig. 3 is a fragmentary enlarged section through the right hand hinge structure, taken in the direction of the arrows along the line 3—3 of Fig. 1.

Fig. 4 is a section taken in the direction of the arrows substantially along the line 4—4 of Fig. 2, showing the hinge device in rear elevation with portions broken away to show details of construction.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring particularly to Fig. 1, a fragmentary portion of an automobile body 10 is shown having a rear trunk or cavity 12 accessible through the automobile rear deck by means of a rear deck lid 14 suitably connected to the body 10 by hinge means described in detail hereinafter. As far as the present invention is concerned, the body 10, trunk 12, and rear deck lid 14 may be conventional in construction and design.

As indicated in more particularity in Figs. 2 and 3, the forward wall of the trunk cavity 12 is bounded by a vertical transversely extending belt rail 16 suitably secured at its ends to the opposite interior sidewalls of the body 10, and secured below to a shelf panel not shown, as for example by welding. In the present instance, the upper edge 18 of the belt rail 16 inclines rearwardly toward the portion of the body 10 comprising the rear deck and then bends forwardly at 20 to underlie the rear deck to which it is preferably welded.

Around the periphery of the trunk opening 12, the body bends downward in a marginal flange 22, then horizontally inward with respect to the opening of the trunk cavity 12 to provide a horizontal supporting flange or edge 24. Suitably secured as by spot welding for example to the under side of the latter flange 24 and to the outer lower edge of the marginal flange 22 is an upward opening channel molding 26 which preferably extends completely around the periphery of the trunk opening in the rear deck. The inner sidewall of the channel molding 26 is formed with a rounded downturned bead molding 28 which is bent into the channel molding to provide a rounded marginal edge for the opening to the trunk cavity 12. A cushion seal 30 comprising a strip of rubber or rubber-like material is firmly pressed into the channel 26 and suitably held therein by friction or cement to provide a seal and supporting cushion for the marginal edges of the deck lid 14 as described hereinafter.

In the present instance a pair of hinge devices embodying the present invention are spaced laterally on opposite sides of the median plane of the automobile body. These are substantially identical in construction and operation and in fact are mirror images of each other. Accordingly details of only the right hand hinge device are shown and discussed herein. A pair of supporting brackets 32 for the two hinge devices are mounted on the rearward wall of the belt rail 16, each comprising a vertical rearward opening channel-like bracket having paired generally triangular lateral and mesial sidewalls 34 and 35 respectively. The latter are reinforced by integral outward flares or flanges 36 and 37 respectively extending from top to bottom thereof on opposite sides of the mouth of the channel structure 32. The base of the channel 32 lies in a vertical plane substantially flush with the belt rail 16 and is suitably spot welded thereto. The reinforcing edge flanges 36 and 37 and the rearward edges of the generally triangular sidewalls 34 and 35 of each bracket 32 extend rearwardly and upward in a slight arch, Figs. 2 and 3, and flare at 38 and 39 respectively outwardly and away from the upper edges of the bracket 32 so as to underlie and reinforce the aforementioned channel strip 26. In the present instance as indicated in Fig. 2, by reason of the transverse curvature of the body portion 10 over the rear deck, the mesial wall 35 and flange 39 of each channel bracket 32 extends slightly higher than the corresponding lateral wall 34 and flange 38.

The base or forward wall of each channel bracket 32 is reinforced by means of a central vertically extending forwardly opening channel 40 formed therein and comprising a recess for a plurality of anchor nuts as described hereinafter. Also for purposes which will be apparent below, a transverse rearward opening concave recess 42 is embossed into each reinforcing channel 40.

The rear deck lid 14 is reinforced in the present instance by an inner ribbed plate or panel 44 having marginal sides 46 extending toward the lid 14 and bent outward at marginal edge flanges 48 so as to lie flush with the underside of the lid 14. The marginal edges of the latter extend beyond and are bent snugly inward and around the marginal flanges 48 to provide a triple thickness overlap flange for the deck lid 14, Figs. 2 and 3.

A pair of longitudinally extending ribs 52 are pressed into the reinforcing panel 44 on opposite sides of the median plane of the body 10, each providing a web or rib to which the straight shank 54 of a goose neck hinge or deck lid supporting arm 56 is secured. The paired hinge arms 56 are identical in the present instance and, as indicated in Fig. 3, the shank 54 of each is provided with a pair of spaced longitudinally extending adjusting bolt holes 58 aligned with a corresponding pair of bolt holes formed centrally within one of each of a pair of annular upward embossments 60 within each rib 52. A nut retainer or clincher 62, which may be of conventional construction, having an annular flanged edge 64 clinched around and under the opening in the annular embossment 60 is provided to hold an anchor nut 66 in alignment with the opening of each annular embossment 60. The threaded end of a bolt 68 extends through each elongate bolt hole 58 and screws into the aforementioned nut 66 to secure the hinge shank 54 rigidly to the rib 52. Preferably a washer such as the lock washer 70 is interposed between the head of the bolt 68 and the portions of the hinge shank 54 around the opening 58.

The curved portion of each goose neck hinge 56 extending forward from the straight shank 54 is reinforced by a central longitudinally extending channel-like embossment 72 and by lateral downward and inward extending marginal flanges 74, which latter extend entirely around the edges of the hinge.

Near the forward extremity of the crook or curve of each goose neck hinge 56, the opposed lateral flanges 74 are perforated at 75 to receive a horizontal transverse pivot pin 76, Fig. 4, which projects from the opposed flanges 74 through the lateral and mesial upper sidewall portions 78 and 80 respectively of one of each of a pair of vertical rearward opening channel-like housings. Each of the latter is dimensioned to fit within one of each of the channel brackets 32 and comprises a pivot mounting for the corresponding hinge arm 56, as well as a housing for a deck lid counterbalancing mechanism cooperable with the said corresponding arm 56 as described more fully below. One end of each pin 76 is provided with an enlarged head 82 which is fitted snugly against the adjacent housing wall 78. The other end of the pin 76 is reduced at 84 and passes snugly through an opening provided therefor in the housing wall 80, being flared or expanded at 86 against the outer portion of the housing wall 80 to prevent withdrawal therefrom.

The wall portions 78 and 80 of the channel housing are thus spaced by the opposed lateral flanges 74 of the goose neck hinge and as indicated in Fig. 4 are juxtaposed thereto. Below the pin 76, the housing sidewall portions 78 and 80 diverge downwardly at 88 and 90 respectively to horizontal inwardly opening channel-like ribs or reinforcements 92 and 94 respectively which extend from front to rear in their respective wall portions. As indicated particularly in Fig. 2, the rearward edges of the channel housing walls decline rearwardly from the pin 76, with the rearward extension of the edges of the wall portions 78, 88, 92 being more pronounced than the corresponding wall portions 80, 90, 94, in order to provide a rounded shoulder or stop 96 below the rib 92 for reasons to be apparent hereinafter. Below the level of the stop 96 the lateral and mesial housing sidewalls belly rearward, then downward and forward at 98 and 100 respectively, substantially in arcs coaxial with the aforementioned cylindrical cavity 42, and terminate in horizontal inturned lapping bottom flanges 102 and 104 respectively which are preferably welded together.

The forward edges of the channel side portions 80, 90, 100 bend laterally at 106 to provide a forward wall which except for a rearwardly curved upper portion extends generally vertically in a transverse plane and lies flush with the base of the forward wall of the channel bracket 32 mesially of the vertical reinforcing channel 40. Along the mesial edge of the channel 40 the wall 106 is offset rearwardly to conform to the contour of the channel 40 and to lie adjacent thereto at 107, Fig. 3. Similarly the forward edge of the channel side wall portions 78, 88, 98, bend mesially at right angles to form a generally vertical forward wall 108 which lies adjacent the base of the channel bracket 32 laterally of the channel 40 and is offset rearwardly to overlap the aforementioned wall portion 107 to 109, Figs. 3 and 4.

It is thus seen that the forward wall portions 106, 107 and 108, 109, comprise the base of the aforementioned channel housing and are preferably spot welded together along the overlapping seams 107 and 109. The upper portions of the forward walls 106 and 108 curve rearward and upward and are spot welded together at overlapping and underlapping upper flange seams 110 and 112 respectively. Coaxially with the cylindrical embossment 42, the lapping seam portions 107 and 109 are cylindrically embossed at 113 and 114 respectively.

A pair of elongate adjusting bolt holes 116 are provided within the welded together seams 107, 109 and aligned with a corresponding pair of bolt holes 117 in the base of the reinforcing channel 40, whereby the bracket 32 and channel housing are rigidly secured together by a pair of bolts 118 and anchor nuts 120, the latter being contained within the channel 40 provided therefor. The nuts 120 are suitably held in position to facilitate assembly by conventional means, such as nut retainers 122 having flanged edge portions 124 clinched around the marginal edges of the corresponding bolt hole 117. Suitable lock washers 126 are interposed between the head of each bolt 118 and the adjacent overlapping seam flange 109.

It is apparent from the construction described above that the rear deck lid 14 is connected to the vehicle body 10 by a pair of goose neck hinges 56, each rigidly secured to the lid 14 and pivotally connected by a pivot pin 76 to the side walls of one of each of a pair of rearward opening vertical channel housings which in turn are rigidly secured to the vehicle body. In the lowered or closed position of the deck lid 14, the forward portion or crest of each goose neck hinge 56 swings forward to a position whereat the flanges 74 straddle the head of the corresponding upper bolt 118 and are spaced from the adjacent channel housing base portions 106 and 108 sufficiently to permit complete closure of the deck lid 14, with the reinforced triple thickness marginal flange thereof pressing snugly against the cushion strip 30 as a weatherproof seal. In order to avoid interference between the head of the aforesaid upper bolt 118 and the crest of the goose neck hinge 56 in the closed position, an opening 128 is provided in the latter to receive the aforesaid upper bolt head 118 as indicated in Fig. 2.

In accordance with the objects of the present invention, counterbalancing means cooperable with the hinge arms 56 and mounted within the channel housings are provided to hold the deck lid 14 in the raised position and to counterbalance the same intermediate the raised and closed positions. To this end the opposed flanges 74 of each hinge arm 56 are provided with a pair of aligned pivot holes 129 at locations forward of the pivot 76 when the lid 14 is in the raised position, Fig. 3. The lateral flange 74 of each arm 56 is pivotally connected to the upper end of an upright slightly arcuate link 130 by means of a transverse pivot pin 132 passing through the lateral pivot hole 129. The paired mesial pivot hole 129 in each hinge arm 56 is not used in the present instance, being provided merely so that the hinge arms 56 may be interchangeably mounted on either the left or right side of the vehicle body 10. The lower end of the link 130 is pivotally connected at 134 to the rearward end of a mesially or inwardly offset crank arm or extension 136 of a pivotal crank arm member 138, which may be suitably formed from a sheet metal stamping. The latter is pivotally mounted on a pivot or bearing portion 140 of reduced diameter at the lateral or outer end of a transverse pivot shaft 142 which for the purpose to be made clear hereinafter is provided with a reduced mesial or inward extension 144 terminating in a still further reduced screw threaded inward extension 146. The other end of the pivot shaft 142 extends from the reduced bearing portion 140 as a screw threaded extension 148 of still further reduced diameter through an opening provided therefor in an annular inward embossment 150 in the body portion 98 of the channel housing sidewall. The inner face of the embossment 150 provides a smooth vertical bearing surface in juxtaposition with the central body portion of the crank arm member 138. Preferably the outer end of the pivot shaft 142 is suitably held in place by means of a nut 154 screwed on the threaded extension 148 snugly against the adjacent outer surface of the embossment 150, so as to draw the crank arm member 138 against the inner surface of the embossment 150 without binding the crank arm against pivotal movement on its journal or bearing 140.

At a plurality of locations around the center of the pivot axis of the crank arm member 138, the latter is lanced to provide three symmetrically disposed inwardly extending arcuate sleeve retainer portions 156 arranged coaxially about the axis of the shaft 142. Mounted coaxially on the sleeve retainers 156 so as to permit rotation of the latter is a fixed cylindrical spring supporting sleeve 158 which extends coaxially with the shaft 142 and terminates in four axially inward extending circumferentially spaced prongs 160. The latter project through a comparatively large circular opening 162 in the housing sidewall 100 of slightly greater diameter than the sleeve 158.

The inward end of the sleeve 158 is suitably supported and prevented from rotation with respect to the channel housing by means of a sleeve retainer plate 164 having four circumferentially spaced arcaute slots 166 opening therein, each adapted to permit passage of one of the inward projecting prongs 160. Axial movement of the sleeve 158 with respect to the retainer 164 is prevented by a circumferentially extending tip 160a of each prong 160, adapted to overlap the inner face of the retainer plate 164, Fig. 2. The tips 160a extend clockwise, Figs. 2 and 3, and are maintained in overlapping relation with respect to the retainer 164 by resilient means described in detail below which is tensioned to urge the sleeve 158 clockwise. Rotational movement between the sleeve 158 and retainer 164 is of course limited by the prongs 160 projecting through the slots 166 of the retainer 164.

The sleeve retainer 164 is also provided with a central opening 168 through which the threaded end 146 of the shaft 142 passes to receive a lock washer 170 and retaining nut 172. The latter is tightly screwed on the extension 146 so as to clamp the sleeve retaining plate 164 against the shoulder of the pivot pin 142 formed at the base of the reduced threaded end portion 146.

The sleeve retainer 164 is adjustably secured to the housing wall 100 by a pair of generally diametrically opposed rivets 174, each having a mesial end 176 expanded snugly against the retainer 164 and an enlarged head 178 spaced from the retainer 164 sufficiently to be positioned laterally of the wall portion 100. Associated with each rivet head 178 are a pair of openings 180 provided within the housing wall 100 to permit passage of the laterally projecting rivet head 178. Each opening 180 communicates with a smaller opening 182 provided in the housing wall 100 to receive the body of the rivet 174 and to prevent passage of the rivet head 178. As indicated particularly in Figs. 1 and 2, two diametrically opposed pairs of such openings 180, 182 are provided to permit limited pivotal adjustment of the position of the sleeve retaining plate 164 about the axis of the shaft 142 with respect to the sidewall 100 for the purpose noted below.

Coiled around the sleeve 158 is a tensioned helical torsion spring 184 having a lateral end 186 looped under and around an inward projecting retaining pin 188 in a manner to urge the same yieldingly counterclockwise about the axis of the shaft 142, as viewed from the left side of the body 10. A shank 190 of the pin 188 passes snugly through an opening 192 provided therefor in the crank arm or extension 136 and is thus secured to the latter at a point generally intermediate the pivot 134 and the pivot axis of the crank arm 136. The outer end of the shank 190 is flared at 194 tightly against the adjacent outer or lateral surface of the crank arm 136 to prevent withdrawal of the shank 190 through the opening 192. The other end 196 of the torsion spring 184 is formed into a loop or hook which passes through an opening 198 provided therefor within the sleeve 158 at a portion of the latter overlying the reduced portion 144 of the pivot shaft, thereby securing said other spring end 196 under tension to the fixed or non-rotatable sleeve 158.

As indicated in Fig. 3, the spring 184 yieldingly urges the crank arm 136 upward counterclockwise about the axis of its mounting 140, so as to move the link 130 upward and in turn raise the lid 14 by virtue of the pivotal connection 132 between the link 130 and hinge arm 56. Lowering of the lid 14 is accomplished against the tension of the spring 184, so that the latter is at maximum tension when the lid 14 is in the fully closed position.

It is thus apparent that the tension of the spring 184 may be predetermined so as to counterbalance the weight of the rear deck lid 14 intermediate the fully raised or fully lowered positions. Minor adjustment of the spring tension to accommodate deck lids of various weights is readily effected during installation by suitably adjusting the position of the sleeve retainer 164. This is of course accomplished by selecting the appropriate pair of retaining holes 180, 182 into which the rivets 174, 178 for the sleeve retainer 164 are inserted.

The dimensions of each crank arm 136, operating link 130, and vertical spacing of the pivots 76 and 140 are preferably selected in consideration of the dimensions of each goose neck hinge 56 and the location of its pivotal attachments at 76 and 132 to the fixed channel walls 78, 80 and to the upper end of the link 130 respectively, so that the link 130 moves up or down generally in the direction of its length upon raising or lowering the deck lid 14. In the present instance, the pivot 140 is below and slightly rearward of the pivot pin 76; the crank arm 136 is a little shorter than the distance between the pivot pins 76 and 132; and each pivot pin 132 and 134 swings in a rearward arc about the axis of its respective pivot 76 and 140, the pins 132 and 134 being located somewhat above and to the rear of their respective pivots 76 and 140 when the deck lid 14 is in the fully raised position, Fig. 3.

As indicated in Fig. 2, when the deck lid 14 is in the generally horizontal closed position, it exerts a maximum clockwise torque about the pivots 76, which must be resisted or counterbalanced by the torsion spring 184. At the same time the tension in the spring 184 is also at a maximum to exert an optimum counterclockwise counterbalancing torque on the crank arm 136 about its pivot 140. It is also to be observed that as the lid 14 approaches the closed position, the pivot pins 132 and 134 approach the lowermost points of their arcs of travel about their respective pivots 76 and 140. Immediately prior to closure of the deck lid 14, the principal component of movement of the pin 132 for example about the pivot 76 is substantially horizontal rather than vertical. Thus movement of the crank arm 136 against the force of the spring 184, which is approaching a maximum, rapidly decreases, permitting the deck lid 14 to be readily closed against a suitable spring operated latching mechanism (not shown) and retained thereby in the closed position.

As the closed deck lid 14 is opened slightly and the pivot 132 moves counterclockwise from its lowermost position, the leverage afforded the substantially vertical component of force of the spring 184 directed through the crank arm 136 increases rapidly to counterbalance the maximum clockwise torque exerted by the weight of the lid 14. Upon continued raising of the lid 14, its center of gravity approaches a position of vertical alignment over the pin 76, thereby decreasing the clockwise moment of force effected by the weight of the lid 14 tending to lower the latter. Thus as the torsion spring 184 unwinds, decreasing its counterbalancing force upon raising the deck lid 14, the opposing force exerted by the lid 14 decreases correspondingly, so that the weight of the lid 14 is effectively counterbalanced at all times between the fully closed and fully raised positions.

In the latter position, an outward projection 200 of the pin 134 seats against the aforementioned rounded shoulder 96 of the upper portion of the sidewall 98 to limit upward pivoting of the lid 14. Also in this position, the moment of force exerted by the weight of the lid 14 about the pivot 76 is so decreased that the spring 184 will positively and safely hold the lid 14 in the raised position. The leverage afforded to the spring 184 in maintaining the lid 14 in the raised position is increased somewhat by virtue of the greater distance between the axes of the pivots 76 and 132 compared to the distance between the axes of the pivots 140 and 134, as indicated in Fig. 3.

When it is desired to lower the lid, the latter may be pulled downward from its most rearward raised extremity by means of a handle usually provided for this purpose. The leverage afforded by the customary rearward length of the lid 14 permits the latter to be readily moved against the initial resisting force of the spring 184 with a minimum of effort on the part of the operator who may thus swing the counterbalanced lid to the closed position.

It is to be observed further that the above described counterbalancing device, which mounts the helical counterbalancing spring 184 on the shaft 142 spaced from the hinge axis 76, is particularly adapted for use with existing hinged deck lids comparable to the lid 14. This adaptation may be accomplished with a minimum of alteration of the existing deck lid hinge structure merely by properly determining the length of the crank arm 136 and link 130, as well as the pivotal connection of the latter with the deck lid, in substantially the manner outlined above.

We claim:

1. In a vehicle body having a rear deck lid, an upright rearward opening channel bracket adapted to be secured to the body, a hinge arm adapted to be secured to said lid and extending forward therefrom to an upper portion of said bracket, pivot means pivotally connecting the forward end of said arm to said bracket for relative pivotal movement about a transverse axis, a second pivot means having a transverse axis and being secured to said bracket at a location below the first pivot means, a crank arm having a rearward extending swinging end and being pivotally mounted at its forward end on said second pivot means, a generally upright rigid link pivotally connected at one end to the hinge arm and at the other end to the swinging end of the crank arm for raising or lowering the deck lid upon upward or downward swinging of the crank arm respectively, fixed spring supporting means located coaxially around said second pivot means and secured at one end to said bracket, means provided by said crank arm for supporting the other end of the spring supporting means, a torsion spring coiled around said spring supporting means and secured under tension at one end thereto, the other end of the spring being connected under tension to the crank arm for yieldingly urging the latter upward.

2. In a vehicle body having a rear deck lid, a rearward opening channel bracket adapted to be secured to the body and having upright channel sidewalls, a hinge arm adapted to be secured to said lid and extending forward therefrom to an upper portion of said bracket, pivot means pivotally connecting the forward end of said arm to said bracket for relative pivotal movement about a transverse axis, a second pivot means having a transverse axis and being secured at one end to one sidewall of said bracket at a location below the first pivot means, the other end of the second pivot means passing through an opening in the other sidewall of the bracket, an adjusting plate, means securing the other end of the second pivot means to said adjusting plate, a crank arm having a rearward extending swinging end and being pivotally mounted at its forward end on said second pivot means, a generally upright rigid link pivotally connected at one end to the hinge arm and at the other end to the swinging end of the crank arm for raising or lowering the deck lid upon upward or downward swinging of the crank arm respectively, fixed spring supporting means located coaxially around said second pivot means and secured at one end to said adjusting plate, means carried by the crank arm for supporting the other end of the spring supporting means, a torsion spring coiled around said spring supporting means and secured under tension at one end thereto, the other end of the spring being connected under tension to the crank arm for yieldingly urging the latter upward, and means adjustably connecting the adjusting plate to the bracket over said opening for varying the tension of the torsion spring.

3. In a counterbalancing device for a vertically swinging lid structure, a supporting bracket, a vertically swing crank arm pivoted on said supporting bracket, a connecting link pivotally connected at one end to the swinging end of said crank arm and adapted at its other end to be pivotally connected to said lid structure, a fixed spring support located coaxially around the pivot axis of said crank arm and secured at one end to said bracket, said crank arm having an extension engaging the other end of said spring support to support the same, a torsion spring around said spring support and secured at one end thereto, the other end of the spring being connected under tension to the crank arm to urge the latter upward.

4. In a counterbalancing device for a vertically swinging lid structure, a supporting bracket, a vertically swinging crank arm pivoted on said supporting bracket, a connecting link pivotally connected at one end to the swinging end of said crank arm and adapted at its other end to be pivotally connected to said lid structure, a cylindrical spring support located coaxially around the pivot avis of said crank arm and secured at one end to said bracket, said crank arm having annularly arranged portions engaging the other end of said spring support to support the same, a torsion spring around said spring support and secured at one end thereto, the other end of the spring being connected under tension to the crank arm to urge the latter upward.

5. In a counterbalancing device for a vertically swinging lid structure, a supporting bracket adapted at an upper location to be hingedly connected to said lid ssructure, a vertically swinging crank arm pivoted on said supporting bracket below said location and having a swinging end adapted to underlie said lid structure, a generally upright connecting link having an upper end adapted to be connected to said lid structure and having a lower end pivotally connected to the swinging end of said crank arm, a cylindrical spring support located coaxially around the pivot axis of said crank arm and secured at one end to said bracket, said crank arm having annularly arranged portions engaging the other end of said spring support to support the same, a torsion spring around said spring support and secured at one end thereto, the other end of the spring being connected under tension to the crank arm to urge the latter upward.

6. In a counterbalancing device for a vertically swinging lid structure, a supporting bracket, a vertically swinging crank arm pivoted on said supporting bracket and having means adjacent its swinging end adapted for connection with said lid structure, fixed spring supporting means located coaxially around the pivot axis of said crank arm and secured at one end to said bracket, means on said crank arm for supporting the other end of the spring supporting means, a torsion spring around said spring supporting means and having one end secured thereto, the other end of the spring being connected under tension to the crank arm.

7. In a counterbalancing device for vertically swinging lid structure, a supporting bracket having an adjustable portion, a vertically swinging crank arm pivoted on said supporting bracket and having means adjacent its swinging end adapted for connection with said lid structure, spring supporting means located coaxially around the pivot axis of said crank arm and secured at one end to said adjustable portion, means on said crank arm for supporting the other end of the spring supporting means, a torsion spring around said spring supporting means and having one end secured thereto, the other end of the spring being connected under tension to the crank arm.

8. In a counterbalancing device for a vertically swinging lid structure, a supporting bracket having an adjustable portion, a vertically swinging crank arm pivoted on said supporting bracket and having means adjacent its swinging end adapted for connection with said lid structure, cylindrical spring supporting means located coaxially around the pivot axis of said crank arm and secured at one end to said adjustable portion, annularly arranged means on said crank arm engaged coaxially with the other end of said spring supporting means to support the same, a torsion spring around said spring supporting means and having one end secured thereto, the other end of the spring being connected under tension to the crank arm.

References Cited in the file of this patent

UNITED STATES PATENTS

| Number | Name | Date |
|---|---|---|
| 252,770 | Howson | Jan. 24, 1882 |
| 1,136,865 | Cherney | Apr. 20, 1915 |
| 1,361,223 | Bersted | Dec. 7, 1920 |
| 1,387,833 | Cheney | Aug. 16, 1921 |
| 2,213,319 | Lickteig | Sept. 3, 1940 |
| 2,259,970 | Benzick | Oct. 21, 1941 |
| 2,272,230 | Van Voorhees | Feb. 10, 1942 |
| 2,308,759 | Joachim | Jan. 19, 1943 |
| 2,320,752 | Roethel | June 1, 1943 |
| 2,341,847 | Roethel | Feb. 15, 1944 |